(12) United States Patent
Haas

(10) Patent No.: US 6,996,154 B2
(45) Date of Patent: Feb. 7, 2006

(54) LOW POWER DUAL PROTOCOL TRANSCEIVER

(75) Inventor: Harry Price Haas, Atlanta, GA (US)

(73) Assignee: Itron, Inc., Spokane, WA (US)

( * ) Notice: Subject to any disclaimer, the term of this patent is extended or adjusted under 35 U.S.C. 154(b) by 942 days.

(21) Appl. No.: 09/920,354

(22) Filed: Aug. 1, 2001

(65) Prior Publication Data

US 2002/0054619 A1    May 9, 2002

Related U.S. Application Data

(60) Provisional application No. 60/222,257, filed on Aug. 1, 2000.

(51) Int. Cl.
*H04K 1/00* (2006.01)
*G08B 23/00* (2006.01)

(52) U.S. Cl. .............. 375/132; 375/140; 375/131; 340/870.02

(58) Field of Classification Search .......... 375/130, 375/140, 132, 135, 136, 146, 147, 131, 219; 340/870.02, 870.03; 455/73, 574
See application file for complete search history.

(56) References Cited

U.S. PATENT DOCUMENTS

| 5,056,107 | A | 10/1991 | Johnson et al. |
| 5,365,550 | A | 11/1994 | Roberson |
| 5,386,435 | A | 1/1995 | Cooper et al. |
| 5,631,636 | A | 5/1997 | Bane ............... 340/825.69 |
| 5,694,420 | A | 12/1997 | Ohki et al. .......... 375/222 |
| 5,726,646 | A * | 3/1998 | Bane et al. ......... 340/870.03 |
| 5,909,640 | A | 6/1999 | Farrer et al. |
| 5,940,428 | A | 8/1999 | Ishiguro et al. |
| 5,959,550 | A * | 9/1999 | Giles ............... 340/870.02 |
| 6,052,406 | A | 4/2000 | Epstein et al. |
| 6,052,407 | A | 4/2000 | Ciccone et al. |
| 6,178,193 | B1 | 1/2001 | Kondo |
| 6,188,715 | B1 | 2/2001 | Partyka |
| 6,246,677 | B1 * | 6/2001 | Nap et al. ............. 370/346 |
| 6,263,009 | B1 | 7/2001 | Ramberg et al. |
| 2002/0071478 | A1 * | 6/2002 | Cornwall et al. ........ 375/132 |
| 2002/0109607 | A1 * | 8/2002 | Cumeralto et al. ..... 340/870.02 |

FOREIGN PATENT DOCUMENTS

| EP | 0178804 A2 * | 4/1986 |
| WO | WO00/11801 | 3/2000 |

* cited by examiner

*Primary Examiner*—Temesghen Ghebretinsae
(74) *Attorney, Agent, or Firm*—Patterson, Thuente, Skaar & Christensen, P.A.

(57) ABSTRACT

The present invention discloses a low power spread spectrum transceiver capable of preserving power while selectively initiating data transmissions under a preferred spread spectrum protocol. The transceiver, while in a power preserving deep sleep mode, uses DSSS circuitry to periodically monitor a predetermined wideband frequency for a spreading code of a DSSS signal from a remote receiving unit. Upon receipt of the appropriate spreading signal, a limited data transmission can be initiated. The DSSS signal contains information that can be decoded and utilized to switch out of DSSS receiving mode and into FHSS communication or transmission mode, or an FHSS session can be initiated automatically upon receipt of an appropriate wake up signal. While in FHSS mode, FHSS encoded data at the end point device's transceiver is communicated to the remote receiving unit. At the completion of the data transfer, the transceiver returns to low power sleep mode and recommences DSSS monitoring.

14 Claims, 2 Drawing Sheets

LOW POWER DUAL PROTOCOL TRANSCEIVER

CLAIM TO PRIORITY

The present application claims priority to U.S. provisional patent application No. 60/222,257 entitled "PN Spreading Code Identifier", and filed Aug. 1, 2000. The contents of this provisional application are hereby incorporated by reference in its entirety.

FIELD OF THE INVENTION

The present invention relates to radio transmission systems and, in particular, to low power transceivers that utilize both direct sequence spread spectrum and frequency hopping spread spectrum technology to transfer data over a wireless communication network.

BACKGROUND OF THE INVENTION

In the field of utility meter reading, wireless communication networks are implemented to gather consumption data from the meters. Generally, a utility meter is equipped with an end point device that accumulates data based on consumption through the meter. This data is then transmitted over a radio frequency (RF) network for receipt by a remotely located station or unit. Depending on the system structure, this data then can be processed and/or re-transmitted to another remote station or unit. While meter reading networks will be referenced as examples of where the present invention can be implemented, the present invention can be employed in any wireless system where low cost, low power, transceivers are needed.

In a metering wireless configuration, unlicensed transceivers using spread spectrum technology must necessarily operate under low power requirements, as dictated by Federal Communications Commission (FCC) regulations. In addition, low power transceiver designs are essential since the transceivers will often be encompassed within handheld portable units, or attached to end point devices. In either case, power conservation issues are a priority since the transceiver, and the other circuitry within the units, derive power from a limited electrical power source such as a battery. As a result of these power concerns, it is desirable to minimize needless transmissions, complex circuitry, and repetitive processes in order to promote the most efficient use of the available power. Ideally, this can be done while, at the same time, minimizing costs.

In wireless networks, there are often significant periods of time when low power transceivers are not required to transmit data. To conserve valuable power, a power reserving "sleep mode" is triggered. In sleep mode, the transceiver awaits a polling signal. The polling signal awakens the transceiver for data transmission. Generally in this sleep mode, any circuitry that is not needed to receive the polling signal is powered down until needed upon transmission initiation.

Spread spectrum technology is widely utilized in wireless networks since it provides additional security, licensing benefits under FCC rules, and resistance to interference. A spread spectrum communication system transmits signals over bandwidths much larger than those actually required to transmit the information. There are two forms of spread spectrum communication utilized in conventional meter reading networks: direct sequence spread spectrum (DSSS) and frequency hopping spread spectrum (FHSS).

In a DSSS system, a PN spreading code generator is used to modulate a frequency carrier. The bandwidth of a DSSS system is a derivative of the chip rate. In an FHSS system, the carrier frequency of the transmitter changes in accordance with the PN spreading code, with the receiver continuously changing its frequency based on its complimentary PN spreading code. The order in which frequencies are occupied are a derivative of the code, and the rate of frequency hopping is a function of the chip rate.

FHSS systems have proven especially appealing in transmitting commodity consumption data in meter reading networks since short bursts of data are transmitted at a rate greater than that obtained under a DSSS transmission. Additionally, the ability to jump between multiple frequencies significantly reduces the chance of interference with an FHSS system. However, the functional benefits associated with FHSS systems inevitably prove problematic in wireless networks requiring low cost, low power, transceivers.

FHSS systems require transceivers with relatively complex circuitry and power consuming circuitry. Specifically, if not controlled, the transmitter will eventually wander or drift in frequency, producing unpredictability in the transceiver operation. To combat this problem it is necessary to stabilize frequency drifting. A phased lock loop is typically used to provide this frequency stability, but such locking circuitry is expensive and results in an undesirable drain on power. Therefore, while the transmission benefits of an FHSS system are appealing, it is necessary to allocate power in a manner that maximizes the efficiency in which the system taxes valuable battery power.

DSSS systems also provide benefits for use in a wireless communication network. As relative to the present invention, the transmission of data over a DSSS signal does not necessarily require the use of locking circuitry since frequency stability is not as significant of an issue. A DSSS transceiver is capable of communicating over a relatively "sloppy", single frequency signal. This single wideband signal significantly reduces the possibility of a transceiver being falsely awakened from deep sleep mode by random noise, which is a problem with narrow band transceivers, as used in an FHSS system. Specifically, the DSSS spreading code alone can serve to awaken the transceiver. While data can be decoded, it is not required to just awaken the transceiver. For these reasons, the problems often associated with frequency stabilizing and powering up are avoided. However, as stated previously, DSSS systems transmit at a lower data rate than FHSS systems. In addition, it is more difficult and expensive to decode the data encoded within a DSSS signal. Since information within the DSSS signal is spread out over a wide bandwidth in a single transmission, decoding or "de-spreading" of the information upon receipt requires a relatively complex decoder. Similarly, a complex encoder is needed to attach data to a DSSS signal. Moreover, the use of a single transmission frequency introduces another drawback in a wireless communication network. The use of a predetermined frequency increases the chances of interference, thus requiring innovations in network structure and transmission timing to better ensure that data transmissions are not lost.

In light of the strengths and weaknesses of DSSS and FHSS systems, a standard practice has been to go with one system protocol over the other, depending upon the particular balance of cost and performance for a given application. In the field of meter reading specifically, the choice has typically been to implement an FHSS system. In a wireless network where a plurality of end point devices periodically transmit short bursts of data to a plurality of remote receiving units, the signal interference benefits and increased transmission rates associated with an FHSS system have made it preferable over DSSS. However, a "pure" FHSS system is problematic since it must keep power demanding circuitry running in order to receive a polling signal. For this reason, an FHSS transceiver cannot go into true deep sleep mode to most efficiently preserve power. Conversely, a DSSS transceiver does not need to maintain stringent frequency accuracy, and without the need for complex frequency locking or decoding circuitry during the polling process, it is able to better optimize power conservation during deep sleep mode.

U.S. Pat. No. 5,661,750 ('750) does describe a system for utility metering implementing DSSS technology, where the system is designed to utilize a high power transmitter and still meet FCC requirements. Specifically, in the '750 system, the transmitter utilizes a modulator to modulate the transmission signal with a pseudo-random pattern to spread the signal across a broader bandwidth than the original signal and uses a second modulator to modulate a preamble of the signal with a phase reversal pattern. The phase reversal pattern increases the number of spectrum lines produced by the transmitter and thereby decreases the power density of the broadcast signal, which for DSSS is +8 dBm in any three KHz bandwidth. While such a DSSS system is recognized to have benefits, the '750 invention uses DSSS transmissions indiscriminately, and in particular, it uses DSSS during the transmission of substantive data rather than as an efficient transceiver wake-up technique. Moreover, the use of DSSS technology for transmitting end point data does not address the signal collision avoidance inherent within an FHSS system.

One system encompassed within the Inovonics Tap-Watch□ system has utilized both DSSS and FHSS technologies in one meter reading network. However, the two spread spectrum technologies are implemented at separate system points within the larger network and have not been optimally combined within any single transceiver in the system so that two communication nodes or points on the network can communicate with each other using both DSSS and FHSS. With Inovonics, the end point transmitters attached to each utility meter utilize a low power FHSS transmitter having less than 0.5 mW. A network of intermediate repeaters receive the low power FHSS transmissions from the end point transmitters and convert these transmissions to DSSS transmissions that are retransmitted by a high power transmitter operating under FCC regulations to base stations for collection and processing. Transmissions between the end point transceiver and the intermediate repeaters are always done over an FHSS signal, and transmissions between the intermediate repeaters and the base station are always done over a DSSS signal.

Based on the inherent advantages and disadvantages of both the DSSS and FHSS systems, there is a need for a low power transceiver that incorporates the benefits from both. While an FHSS system is preferable at the data communication or transmission stage, the power conservation focus of a deep sleep mode is more efficiently dealt with under a DSSS system. The present invention advances a low power transceiver that utilizes DSSS technology for waking up from deep sleep mode and FHSS technology for substantive data communication with the remote receiving unit. The communication between the end point devices and the remote receiving units is not limited to one spread spectrum protocol.

SUMMARY OF THE INVENTION

The present invention discloses a low power spread spectrum transceiver capable of preserving power while selectively initiating data transmissions under a preferred spread spectrum protocol. The transceiver, while in a power preserving deep sleep mode, uses DSSS circuitry to periodically monitor a predetermined wideband frequency for a spreading code of a DSSS signal from a remote receiving unit. Upon receipt of the appropriate spreading signal, a limited data transmission can be initiated. The DSSS signal contains information that can be decoded and utilized to switch out of DSSS receiving mode and into FHSS communication or transmission mode, or an FHSS session can be initiated automatically upon receipt of an appropriate wake up signal. While in FHSS mode, FHSS encoded data at the end point device's transceiver is communicated to the remote receiving unit. At the completion of the data transfer, the transceiver returns to low power sleep mode and recommences DSSS monitoring.

Rather than relying on one method of spread spectrum technology, the transceiver embodied within the present invention utilizes the optimal spread spectrum technology at each stage of the communication process with another device or unit. The spreading code of a received DSSS signal is sufficient to awaken the transceiver from deep sleep without the need for complex decoding or encoding circuitry to communicate via DSSS, while the transmission of data from the transceiver to the remote receiving unit can be conducted using preferred FHSS techniques.

DETAILED DESCRIPTION OF THE PREFERRED EMBODIMENT

Figure 1:
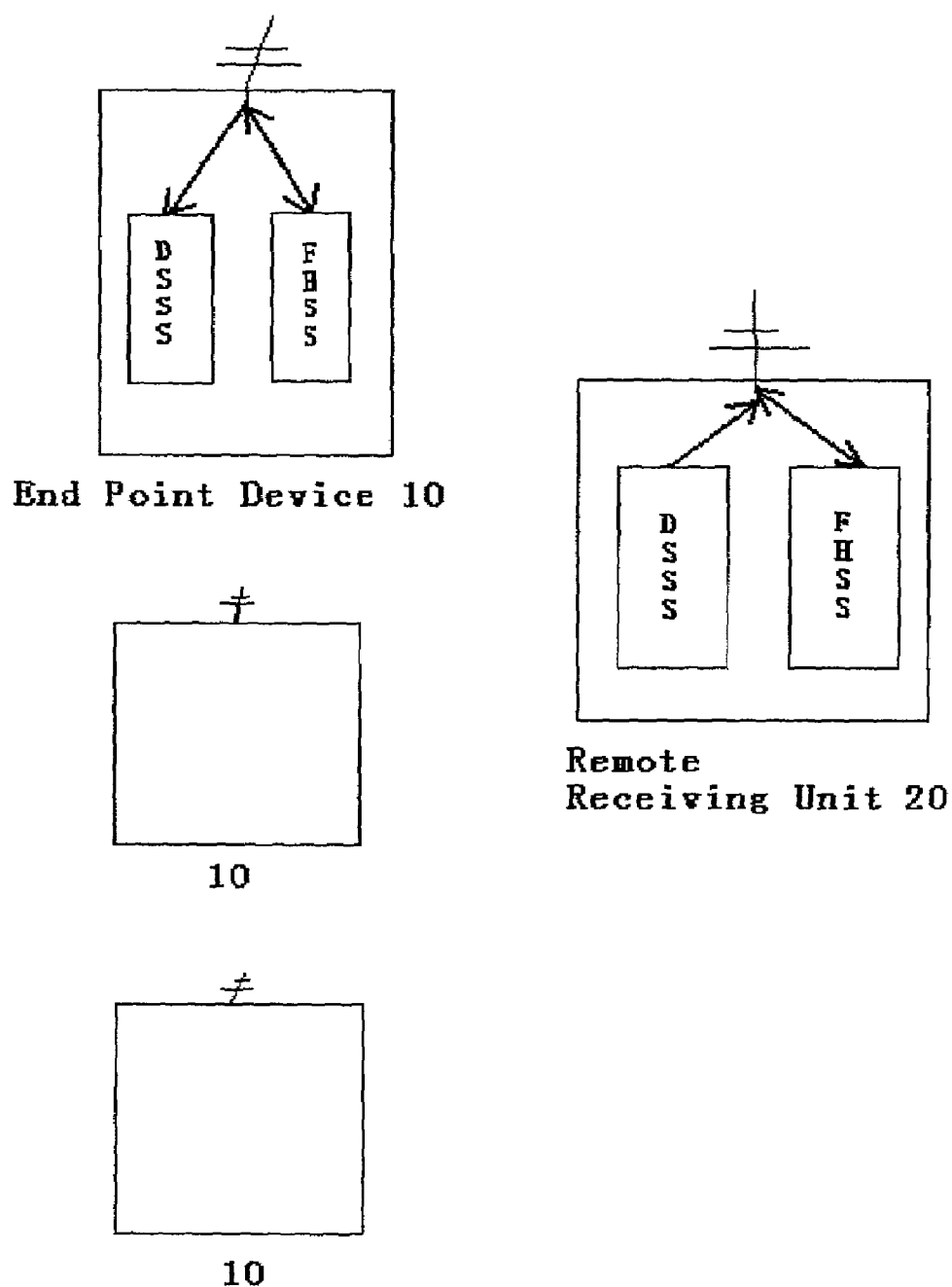
FIG. 1 is a diagram of the wireless communication of the present invention.
Figure 2:
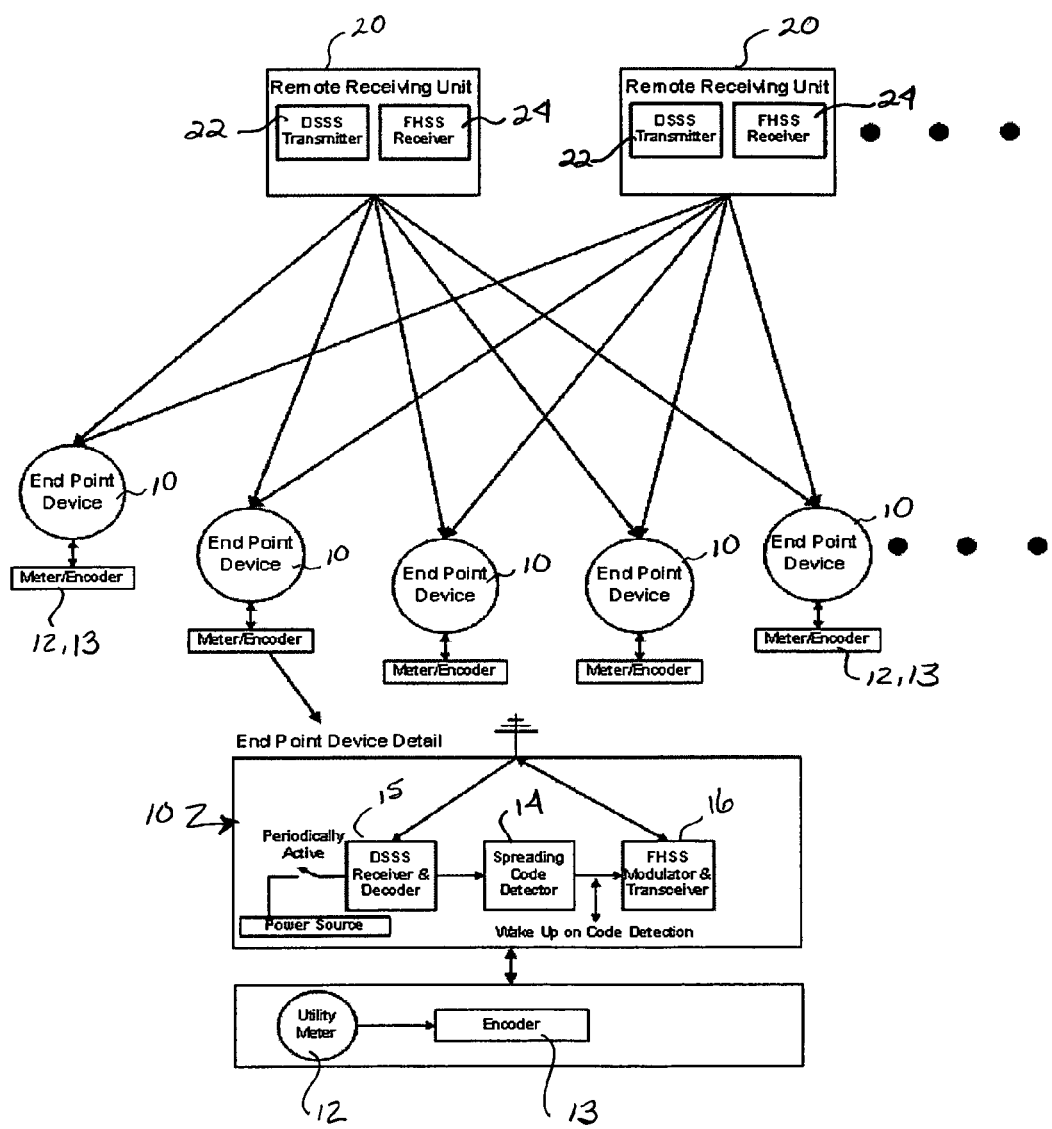
FIG. 2 is a detailed diagram of the wireless communication of the present invention.

Referring to FIGS. 1 and 2, in a preferred embodiment of the present invention, a plurality of end point devices 10 are in wireless communication with a plurality of remote receiving units 20. At least one of the remote receiving units 20 periodically polls at least one of the end point devices 10 to initiate a data transfer in which consumption data is uploaded to the remote unit 20. These multi-layered wireless networks are common to the art, and the systems exampled in U.S. Pat. Nos. 5,056,107 and 6,172,616 are incorporated here by reference.

The end point devices 10 are in communication with corresponding utility meters 12 for reading, storing, and transmitting utility consumption data. Such end point devices 10 are common in the art as encoders 13 and transmitters of consumption data, and as an example, U.S. Pat. No. 5,963,146 is incorporated here by reference to demonstrate the conventional application of such art.

The end point devices 10 of the present invention include a DSSS receiver and decoder 15 for periodically receiving a DSSS signal, and a FHSS modulator and transceiver 16 for primarily transmitting consumption data on an FHSS signal. A correlator 14 is in communication with the receiver 15, and responds to one of a possible plurality of predetermined spreading codes to awaken the transceiver 16. The correlator 14 can use the decoded data from the DSSS signal to initiate an FHSS communication with the remote receiving unit 20 that transmitted the original DSSS signal. Those skilled in the art will understand that the decoder (for example, a correlator) can use the decoded data within the DSSS signal to switch to an FHSS transmission protocol through the employment of hardware, software, or a combination thereof.

The remote receiving units 20 comprise a transmitter 22 for transmitting DSSS signals, and a receiver 24 for primarily receiving FHSS signals. The remote receiving units 20 can be embodied within a handheld portable unit, a mobile unit such as a vehicle, a fixed unit within geographic proximity of at least one of the plurality of end point devices 10, or other fixed or mobile data gathering units understood by those skilled in the art for obtaining data from end point devices 10 or other telemetric devices throughout a wireless communication network. The use of remote receiving units is common practice in the art. As an example of the use of fixed remote receiving units in wireless meter reading systems, U.S. Pat. Nos. 6,172,616 and 5,553,094 are incorporated here by reference. U.S. Pat. Nos. 4,652,855 and 5,808,558 are examples of conventional handheld portable units used to remotely gather end point data and are incorporated here by reference.

In operation, an end point device 10 transceiver is primarily equipped to operate in three modes: deep sleep DSSS mode, data decode DSSS mode, and data communication FHSS mode. The end point device 10 transceiver generally begins, and spends most of its time, in deep sleep mode.

The end point device 10 is in data communication with a utility meter 12. Consumption data is encoded and stored by the end point device 10 for wireless transmission to a remote location for further transmission and/or processing. During this encoding phase, the end point device 10 transceiver is not needed. Consequently, in order to conserve the valuable and limited power available to the end point device 10, the transceiver circuitry is operated in deep sleep mode. In deep sleep mode, any non-essential circuitry is powered down. Non-essential circuitry is any circuitry not needed in order to keep the receiver portion of the transceiver powered up to scan or "sniff" the surrounding air for a DSSS signal at a predetermined frequency. In deep sleep mode, even the transceiver circuitry that is needed to scan the air is only powered up during the periodic scans, and then only for the short duration of the scan. This process is continued until the transceiver detects a triggering DSSS spreading code.

Upon receipt of the proper DSSS signal, the necessary transceiver circuitry is powered up in order to receive and/or decode the data, The decoding is performed by a decoder such as a correlator. While a correlator is referenced throughout this disclosure, it will be understood to those skilled in the art that other decoders can be utilized without deviating from the scope of the invention. The correlator decodes or despreads the data encoded within the received DSSS signal using the correlator's spreading code. Encoded within each DSSS signal is a corresponding spreading code that identifies and triggers a wake-up event for the transceiver and provides the data for use in triggering the FHSS communication or transmission mode.

Data extracted from the DSSS signal can provide synchronization, timing, control, addressing and other information for use in the upcoming FHSS communication. The transceiver's transmitter initiates an FHSS transmission, with the decoded DSSS data providing the synchronization controls required to frequency hop with the remote receiving unit 20. In this FHSS mode, the FHSS circuitry maintains frequency stability and synchronization with the remote receiving unit 20. In addition, while the preferred embodiment will decode the DSSS signal upon receipt of the proper spreading code to begin a synchronous FHSS communication session, the transceiver is capable of initiating an FHSS communication session automatically upon receipt of the spreading code.

End point device 10 is also capable of receiving FHSS signals from the remote receiving unit 20 once the FHSS session has been initiated. Similarly, remote receiving unit 20 is capable of transmitting FHSS signals to the end point device 10 once the FHSS session has been initiated. Once the synchronous FHSS communication has begun, a two-way FHSS communication session between the end point device 10 and the remote receiving unit 20 is possible. Descriptions of the end point device 10 transmitting an FHSS signal and the remote receiving unit 20 receiving an FHSS signal are merely used to describe the initiation stage of the FHSS communication mode and are not to be interpreted as limiting later two-way communications.

Once the requested data has been transmitted from the end point device 10 to the remote receiving station 20, the transceiver again resumes deep sleep mode with the powering down of all non-essential transmission and receiving circuitry.

The present invention may be embodied in other specific forms without departing from the spirit of the essential attributes thereof. Therefore, the illustrated embodiments should be considered in all respects as illustrative and not restrictive, reference being made to the appended claims rather than to the foregoing description to indicate the scope of the invention.

What is claimed is:

1. An RF communication network for communicating information comprising:
    a plurality of remote receiving units, each of the remote receiving units comprising:
        a transmitter for transmitting direct sequence spread spectrum signals; and
        a receiver for receiving frequency hopping spread spectrum signals;
    a plurality of end point devices, each of the end point devices comprising:
        a receiver for periodically receiving a direct sequence spread spectrum signal from at least one of the plurality of remote receiving units;
        a decoder, the decoder using a spreading code and the received signal from the remote receiving unit to receive wake-up information and other data used to initiate a synchronous frequency hopping spread spectrum communication session with the remote receiving unit; and
        a transmitter for transmitting data on the frequency hopping spread spectrum signal to the remote receiving unit.

2. The network of claim 1, wherein the RF communication network is an RF wireless meter reading network.

3. The network of claim 1, wherein the end point device is a transceiver connected to a utility meter in a wireless meter reading network, such that the transceiver is in communication with an encoder attached to the utility meter for transmission of data generated by the utility meter.

4. The network of claim 1, wherein the receiver of the end point devices is further capable of receiving frequency hopping spread spectrum signals from the remote receiving units after the initiation of the frequency hopping session.

5. The network of claim 1, wherein the transmitter of the remote receiving units is further capable of transmitting frequency hopping spread spectrum signals to the end point devices after the initiation of the frequency hopping session.

6. An RF communication network for communicating information comprising:
   a plurality of remote receiving units, each of the remote receiving units comprising:
      means for transmitting direct sequence spread spectrum signals; and
      means for receiving frequency hopping spread spectrum signals;
   a plurality of end point devices, each of the end point devices comprising:
      means for periodically receiving a direct sequence spread spectrum signal from at least one of the plurality of remote receiving units;
      means for using a spreading code and the received signal from the remote receiving unit to wake-up and receive data used to initiate a synchronous frequency hopping spread spectrum transmission session with the remote receiving unit; and
      means for transmitting data on the frequency hopping spread spectrum signal to the remote receiving unit.

7. The network of claim 6, wherein the RF communication network is an RF wireless meter reading network.

8. The network of claim 6, wherein the end point device is a transceiver connected to a utility meter in a wireless meter reading network, such that the transceiver is in communication with an encoder attached to the utility meter for transmission of data generated by the utility meter.

9. The network of claim 6, wherein the means for receiving at the end point devices is further capable of receiving frequency hopping spread spectrum signals from the remote receiving units after the initiation of the frequency hopping session.

10. The network of claim 6, wherein the means for transmitting at the remote receiving units is further capable of transmitting frequency hopping spread spectrum signals to the end point devices after the initiation of the frequency hopping session.

11. An RF communication network for communicating information comprising:
   a plurality of meter reading units for collecting data generated by utility meters, each of the meter reading units having
      a receiver for periodically receiving a direct sequence spread spectrum signal;
      a modulator for modulating a data into packets of data for later transmission on a frequency hopping spread spectrum carrier;
      a decoder, the decoder using a spreading code and the received direct sequence spread spectrum signal to wake-up and receive data used to initiate a synchronous frequency hopping spread spectrum transmission session; and
      a transmitter for transmitting data on the frequency hopping spread spectrum signal;
   a plurality of remote receiving units, the remote receiving units being arranged in an array relative to the meter reading units such that each remote receiving unit can receive data from a plurality of said meter reading units and such that the data transmitted by most of said meter reading units can be received by at least a respective two of said remote receiving units, each remote receiving unit comprising:
      a transmitter for transmitting a direct sequence spread spectrum signal to at least one of the plurality of meter reading units; and
      a receiver for receiving the frequency hopping spread spectrum signal containing the data from the meter reading units.

12. The network of claim 11, wherein the receiver of the meter reading units is further capable of receiving frequency hopping spread spectrum signals from the remote receiving units after the initiation of the frequency hopping session.

13. The network of claim 11, wherein the transmitter of the remote receiving units is further capable of transmitting frequency hopping spread spectrum signals to the meter reading units after the initiation of the frequency hopping session.

14. A method of initiating a frequency hopping spread spectrum data transmission session from data received in a direct sequence spread spectrum signal, comprising the steps of:
   transmitting from a remote receiving unit a direct sequence spread spectrum signal;
   receiving at an end point device the direct sequence spread spectrum signal from the remote receiving unit;
   decoding at the end point device the direct sequence spread spectrum signal such that the spreading code wakes up the end point device from low power mode, and such that the signal data begins a synchronous frequency hopping spread spectrum communications session with the remote receiving unit;
   transmitting data from the end point device in a frequency hopping spread spectrum signal; and
   receiving data at the remote receiving unit in the frequency hopping spread spectrum signal from the end point device.

* * * * *